United States Patent
Deo et al.

(10) Patent No.: US 6,304,914 B1
(45) Date of Patent: Oct. 16, 2001

(54) METHOD AND APPARATUS FOR PRE-COMPRESSION PACKAGING

(75) Inventors: Vinay Deo, Bellevue; Don Kadyk, Bothell; Michael J. O'Leary, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/158,678

(22) Filed: Sep. 22, 1998

(51) Int. Cl.[7] .................... G06F 15/16; G06F 13/38; G06F 15/177
(52) U.S. Cl. .................... 709/247; 709/234; 709/206
(58) Field of Search .................... 709/247, 246, 709/236, 231, 233, 245; 707/101; 341/60; 382/232, 233; 370/447, 521; 708/203

(56) References Cited

U.S. PATENT DOCUMENTS

| | | | |
|---|---|---|---|
| 5,548,532 | * 8/1996 | Menand et al. | 364/514 |
| 5,561,805 | * 10/1996 | Bruck et al. | 395/800 |
| 5,579,316 | * 11/1996 | Venters et al. | 370/94.1 |
| 5,701,302 | * 12/1997 | Geiger | 370/521 |
| 5,754,768 | * 5/1998 | Brech et al. | 709/230 |
| 5,774,467 | * 6/1998 | Herrera Van Der Nood et al. | 370/428 |
| 5,850,526 | * 12/1998 | Chou | 709/247 |
| 5,946,633 | * 8/1999 | McAlinden | 455/551 |
| 5,949,418 | * 9/1999 | Shields et al. | 345/342 |
| 5,966,385 | * 10/1999 | Fujii et al. | 370/465 |
| 6,003,089 | * 12/1999 | Shaffer et al. | 709/233 |
| 6,032,197 | * 2/2000 | Birdwell et al. | 709/247 |
| 6,052,735 | * 4/2000 | Ulrich et al. | 709/236 |
| 6,134,245 | * 10/2000 | Scarmalis | 370/474 |
| 9,107,899 | 6/1998 | Tuniman et al. | |

FOREIGN PATENT DOCUMENTS

2311701-A * 10/1997 (GB) .................... H04L/12/56

OTHER PUBLICATIONS

Cobb, Preserving Quality of service Guarantees in Spite of Flow Aggregation, Extending Visual Basic's Comm control, Oct. 1998, Department of Computer Science The University of Texas, 9 pages.*

IBM Technical Bulletin, DekoVert I Program for Systrace Types Hooks, Dec. 1991, IBM, vol. 34, No. 7A, pp. 3.*

IBM Technical Bulletin, End of Packet Optimization when Cell Routing with Early Drop, May 1997, IBM, vol. 40, No. 5, pp. 2.*

Baker, Reducing network overhead, Apr. 1994, Mercer Island, vol. 12, No. 4, pp. 4.*

Murase et al., Mobile redio Packet Data Communications in a TDMA Digital Cellular System, Mar. 1997, IEEE, pp. 1034–1038(5).*

U.S. application No. 09/107,899, Tuniman et al., pending.

* cited by examiner

Primary Examiner—Mark H. Rinehart
Assistant Examiner—Bunjob Jaroenchonwanit
(74) Attorney, Agent, or Firm—Theodore M. Magee; Westman, Champlin & Kelly, P.A.

(57) ABSTRACT

A computer readable medium in a computer system has instructions for storing a first and second data packet destined for the same address. The first and second data packets are appended together to produce a merged data packet that is then compressed to produce a compressed data packet. The compressed data packet is then sent to the common address.

18 Claims, 7 Drawing Sheets

METHOD AND APPARATUS FOR PRE-COMPRESSION PACKAGING

TECHNICAL FIELD

The present invention relates to computer communication systems. In particular, the present invention has application in wireless computer systems.

BACKGROUND OF THE INVENTION

Hand-held wireless systems, such as pagers and palm-top computers, are currently being designed to receive information along dedicated communication channels. Each channel typically is dedicated to a particular type of content that is to be displayed on the mobile device. For example, users can subscribe to a news channel that provides news updates periodically during the day.

The information is typically transmitted to the wireless device by a content provider who packages the information in a data packet addressed to the wireless device. Since the content provider sends messages to multiple devices, each wireless device must examine the addresses of the packets it receives to determine if it is the intended recipient of the data packet. Each time the wireless device makes such a determination, it consumes power. Thus, it is desirable to limit the number of times that the wireless device must make such determinations.

In addition, as with all communication systems, wireless communication systems have a limited bandwidth. Thus, it is desirable to transmit information as compactly as possible.

Unfortunately, current wireless systems that send periodic current-event updates, such as news and sports, tend to produce a large number of short messages. Under the prior art, each of these short messages is sent separately to the wireless devices. This causes each wireless device to process each separate message to determine if it is addressed to the wireless device.

In addition, because the messages are short, they do not lend themselves to being compressed using current compression technologies and thus, negatively impact the wireless communication system's bandwidth. In fact, the messages are so short that under many compression algorithms the compressed data produced from the message is actually longer than the original message because of overhead associated with the compression algorithm.

SUMMARY OF THE INVENTION

A computer readable medium in a computer system has instructions for storing a first and second data packet destined for the same address. The first and second data packets are appended together to produce a merged data packet that is then compressed to produce a compressed data packet. The compressed data packet is then sent to the common address.

The instructions also provide for producing a header that is pre-pended to the merged data packet and that is compressed along with the merged data packet to produce the compressed data packet. In further embodiments, a master header is placed in front of the compressed packet to provide an address for the compressed data packet. A routing tag is also placed in front of the compressed packet to indicate that the compressed data packet needs to be separated into individual messages after it is decompressed.

DETAILED DESCRIPTION OF THE INVENTION

Figure 1:
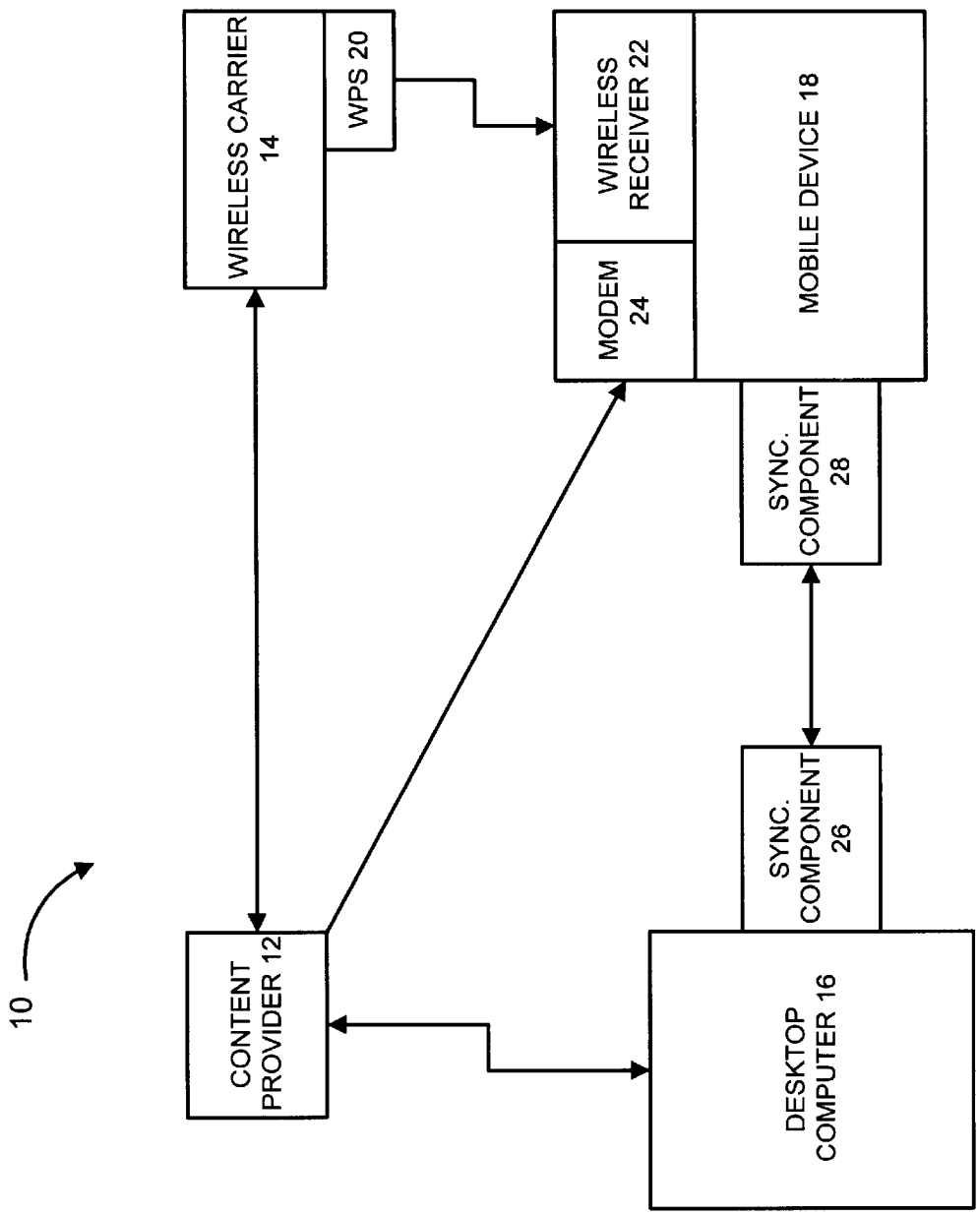
FIG. 1 is a plan view of a mobile device system.

FIG. 1 illustrates a system 10 in which the present invention is illustratively implemented. System 10 includes content provider 12, wireless carrier 14, desktop computer 16 and mobile device 18. Content provider 12 provides any suitable type of data from a database or other data source. For example, under the present invention content provider 12 can provide Internet World Wide Web content or current event information such as news, sports, weather, traffic, and stock information. Wireless carrier 14 is configured to receive content from the content provider 12 via dial-up or direct Internet connection, or a network connection. Wireless carrier 14 also includes a wireless push server 20. Server 20 packages the content received from content provider 12 so that it is compatible with the particular type of transport being used by wireless carrier 14. Under the method of the present invention, discussed further below, this includes grouping different messages together before compressing them for transport. It may also include encrypting and encoding the data before transport.

Once the data is properly formatted, it is transmitted over the air through a wireless network (such as through a paging channel) to be received directly on mobile device 18. The transmitted data is received by a wireless receiver and driver component 22 on mobile device 18 where the data is prepared for use by mobile device 18.

Mobile device 18 also preferably includes a modem 24. Thus, rather than being transmitted through wireless carrier 14, the provider's content can be transmitted directly from provider 12 through a direct dial-up modem connection to mobile device 18.

In one embodiment of the invention, a desktop computer 16 is also provided that can periodically retrieve or receive new and updated data from content provider 12. Computer 16 can render this data on its own associated monitor or in some embodiments, can transmit the data to mobile device 18.

Data on either computer 16 or mobile device 18 can be transmitted to the other device through a synchronization component 26 on computer 16 that is configured to interact with a similar synchronization component 28 on mobile device 18. Once synchronized, the affected data on both computer 16 and mobile device 18 is the same. In some embodiments, mobile device 18 can be synchronized with either desktop computer 16, or another mobile device 18, or both. The connection to other mobile devices can be made using any suitable, and commercially available communication link and using a suitable communications protocol. For instance, in one embodiment, mobile device 18 communicates with either desktop computer 16 or another mobile device 18 with a physical cable, which communicates using a serial communications protocol. Other communication mechanisms are also contemplated by the present invention, such as infrared (IR) communication or other suitable communication mechanisms.

Although wireless device 18 has been described as having the ability to communicate directly with the desktop computer 16 and with content provider 12, those skilled in the art will recognize that less sophisticated mobile devices under the present invention will not have these abilities. In particular, some mobile devices under the present invention do not include a modem, such as modem 24 of FIG. 1, or synchronization component 28 of FIG. 1.

Figure 2:
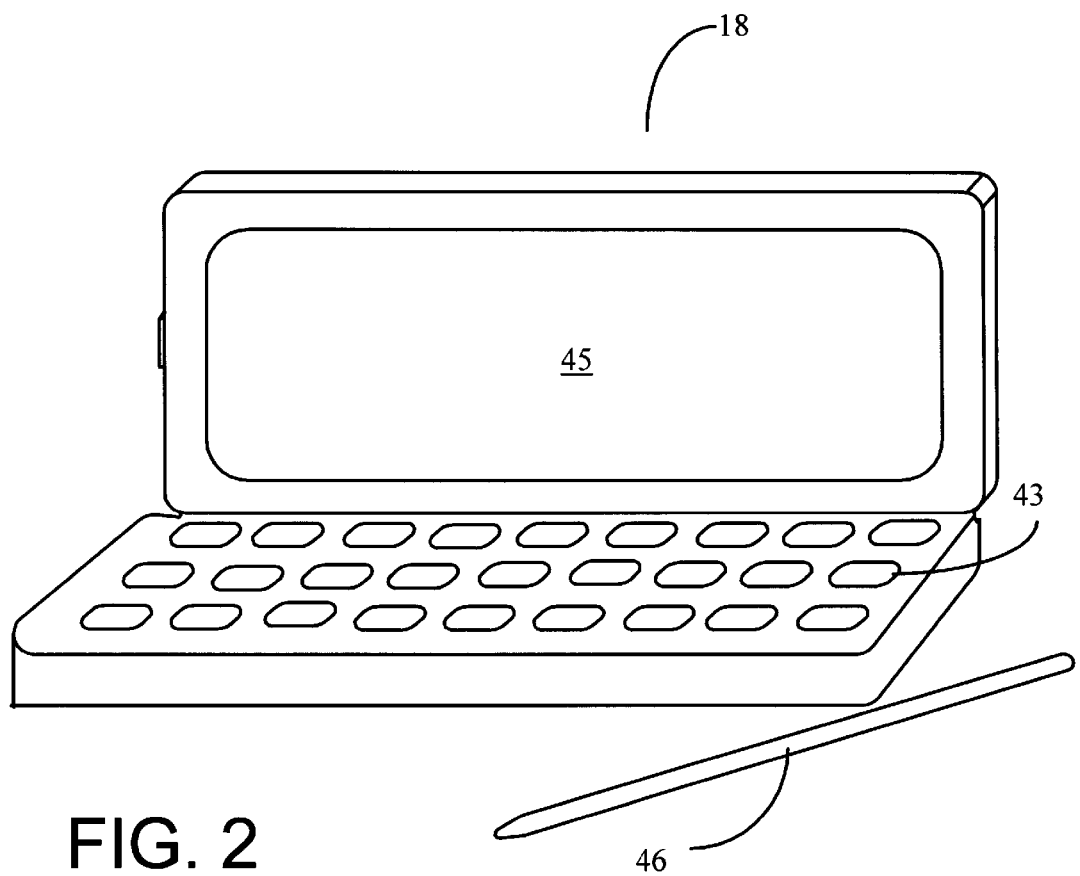
FIG. 2 is a pictorial illustration of one embodiment of a mobile device of the present invention.

FIG. 2 is a simplified pictorial illustration of one embodiment of a mobile device 18 that can be used in accordance with the present invention. Mobile device 18, as illustrated in FIG. 2, can be a desktop assistant sold under the designation H/PC having software provided by the Microsoft Corporation. In this embodiment, mobile device 18 includes a miniaturized keyboard 43, display 45 and stylus 46. In the embodiment shown in FIG. 2, display 45 is a liquid crystal display (LCD) which uses a contact sensitive display screen in conjunction with stylus 46. Stylus 46 is used to press or contact display 45 at designated coordinates to accomplish certain user input functions. Miniaturized keyboard 43 is preferably implemented as a miniaturized alphanumeric keyboard, with any suitable and desired function keys which are also provided for accomplishing certain user input functions.

Figure 3:
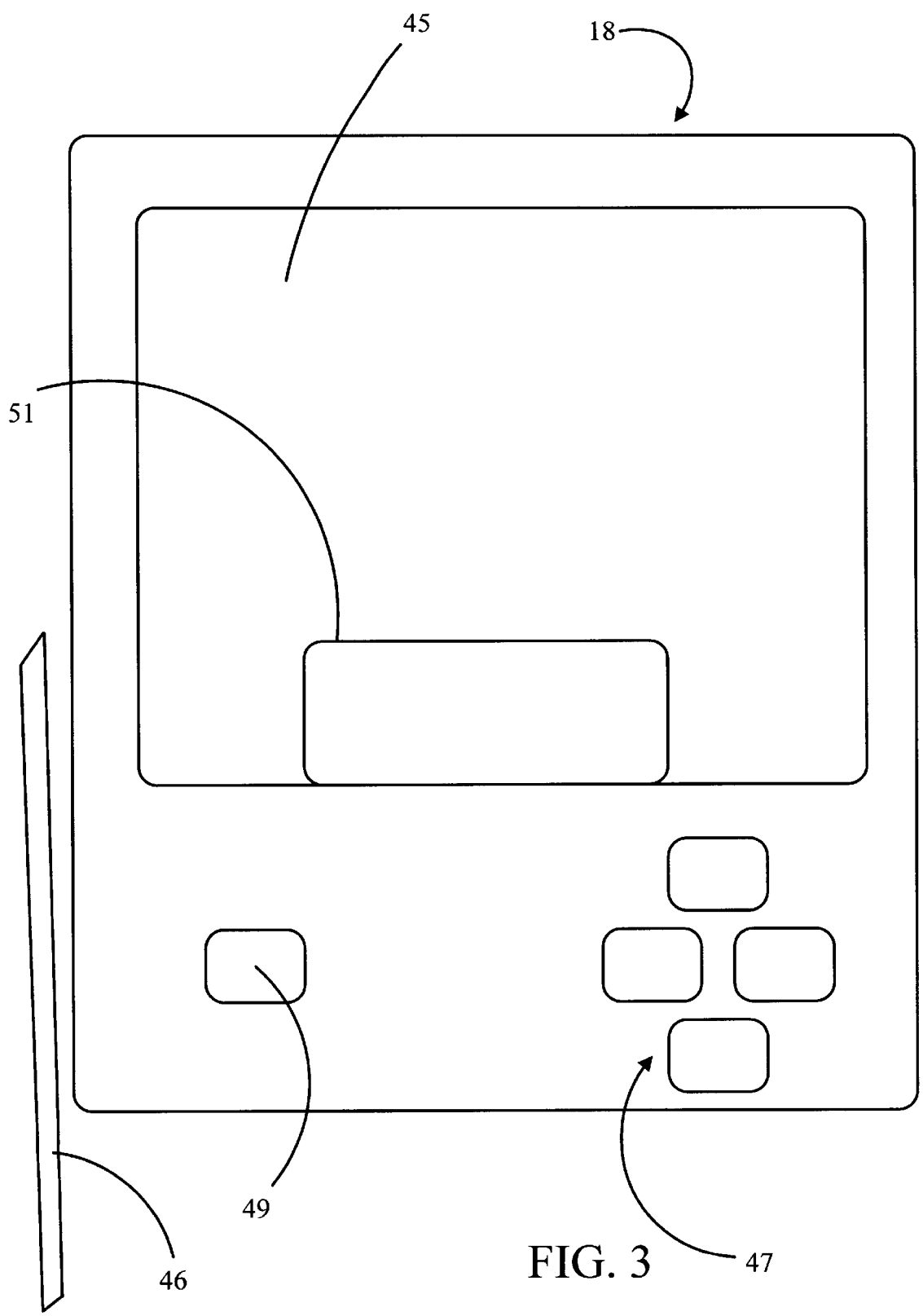
FIG. 3 is a pictorial illustration of another embodiment of a mobile device of the present invention.

FIG. 3 is a simplified pictorial illustration of another embodiment of mobile device 18 used in accordance with the present invention. Mobile device 18, as illustrated if FIG. 3, includes some items which are similar to those described with respect to FIG. 2, and are similarly numbered. For instance, mobile device 18, as shown in FIG. 3, also includes touch sensitive screen 45, which can be used, in conjunction with stylus 46, to accomplish certain user input functions. It should be noted that display 45 for the mobile device as shown in FIG. 2 and 3 can be the same size as one another, or different sizes from one another, but would typically be much smaller than a conventional display used with a desktop computer. For example, displays 45 shown in FIGS. 2 and 3 may be defined by a matrix of only 240-by-320 coordinates, or 160-by-160 coordinates, or any other suitable size.

The mobile device 18 shown in FIG. 3 also includes a number of user input keys or buttons (such as scroll buttons 47), which allow the user to scroll through menu options or other display options which are displayed on display 45. The input keys also allow the user to change applications without contacting display 45. In addition, mobile device 18 as shown in FIG. 3 includes a power button 49, which can be used to turn on and off the general power to the mobile device 18.

It should also be noted that, in the embodiment illustrated in FIG. 3, mobile device 18 includes a hand writing area 51. Hand writing area 51 can be used in conjunction with stylus 46 such that the user can write messages which are stored in memory 42 for later use by the mobile device 18. In one illustrative embodiment, the hand written messages are simply stored in hand written form and can be recalled by the user and displayed on display screen 45 such that the user can review the hand written messages entered into the mobile device 18. In another embodiment, mobile device 18 is provided with a character recognition module such that the user can enter alpha-numeric information on area 51 with stylus 46. In that instance, the character recognition module in the mobile device 18 recognizes the alpha-numeric characters and converts the characters into computer recognizable alpha-numeric characters which can be used by application programs in mobile device 18.

Figure 4:
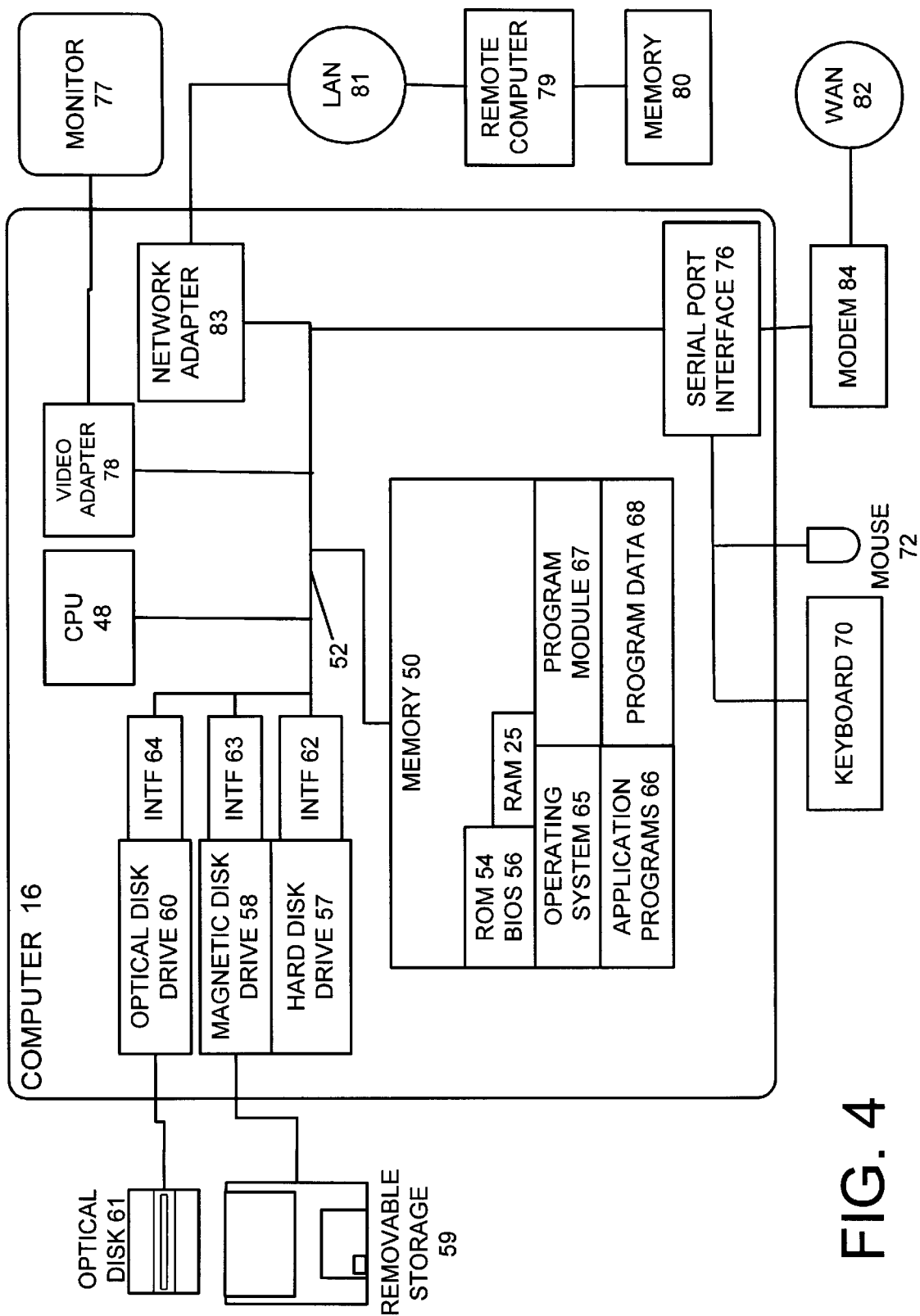
FIG. 4 is a more detailed block diagram of the desktop computer of FIG. 1.

FIG. 4 and the related discussion are intended to provide a brief, general description of a suitable desktop computer 16 in which portions of the invention may be implemented. Although not required, the invention will be described, at least in part, in the general context of computer-executable instructions, such as program modules, being executed by a personal computer 16 or mobile device 18. Generally, program modules include routine programs, objects, components, data structures, etc. that perform particular tasks or implement particular abstract data types. Moreover, those skilled in the art will appreciate that desktop computer 16 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 4, an exemplary system for implementing desktop computer 16 includes a general purpose computing device in the form of a conventional personal computer 16, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54, and a random access memory (RAM) 55. A basic input/output system (BIOS) 56, containing the basic routine that helps to transfer information between elements within the desktop computer 16, such as during start-up, is stored in ROM 54. The desktop computer 16 further includes a hard disc drive 57 for reading from and writing to a hard disc (not shown), a magnetic disk drive 58 for reading from or writing to removable magnetic disc 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer readable media provide nonvolatile storage of computer readable instructions, data structures, program modules and other data for the desktop computer 16. Although the exemplary environment described herein employs a hard disk, a removable magnetic disk 59, and a removable optical disk 61, it should be appreciated by those skilled in the art that other types of computer readable media that can store data and that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66 (which may include PIMs), other program modules 67 (which may include synchronization component 26), and program data 68.

A user may enter commands and information into desktop computer 16 through input devices such as a keyboard 70, pointing device 72 and microphone 74. Other input devices (not shown) may include a joystick, game pad, satellite dish, scanner, or the like. These and other input devices are often connected to processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speakers or printers.

Desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG. 4. The logic connections depicted in FIG. 4 include a local area network (LAN) 81 and a wide area network (WAN) 82. Such networking environments are commonplace in offices, enterprise-wide computer network intranets and the Internet.

When used in a LAN networking environment, desktop computer 16 is connected to the local area network 81 through a network interface or adapter 83. When used in a WAN networking environment, desktop computer 16 typically includes a modem 84 or other means for establishing communications over the wide area network 82, such as the Internet. The modem 84, which may be internal or external, is connected to the system bus 52 via the serial port interface 76. In a network environment, program modules depicted may be stored in the remote memory storage devices. It will be appreciated that the network connections shown are exemplary and other means of establishing a communications link between the computers may be used.

Desktop computer 16 runs operating system 65, which is typically stored in non-volatile memory 54 and executes on processor 48. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, New York.

Application programs are preferably stored in program module 67, in volatile memory or non-volatile memory, or can be loaded into any of the components shown in FIG. 4 from disc drive 59, CDROM drive 61, downloaded from a network via network adapter 83, or loaded using another suitable mechanism.

A dynamically linked library (DLL), comprising a plurality of executable functions is associated with PIMs in the memory for execution by processor 48. Interprocessor and intercomponent calls are facilitated using the component object model (COM) as is common in programs written for Microsoft Windows brand operating systems. Briefly, when using COM, a software component such as DLL has a number of interfaces. Each interface exposes a plurality of methods, which can be called individually to utilize different services offered by the software component. In addition, interfaces are provided such that methods or functions can be called from other software components, which optionally receive and return one or more parameter arguments.

Figure 5:
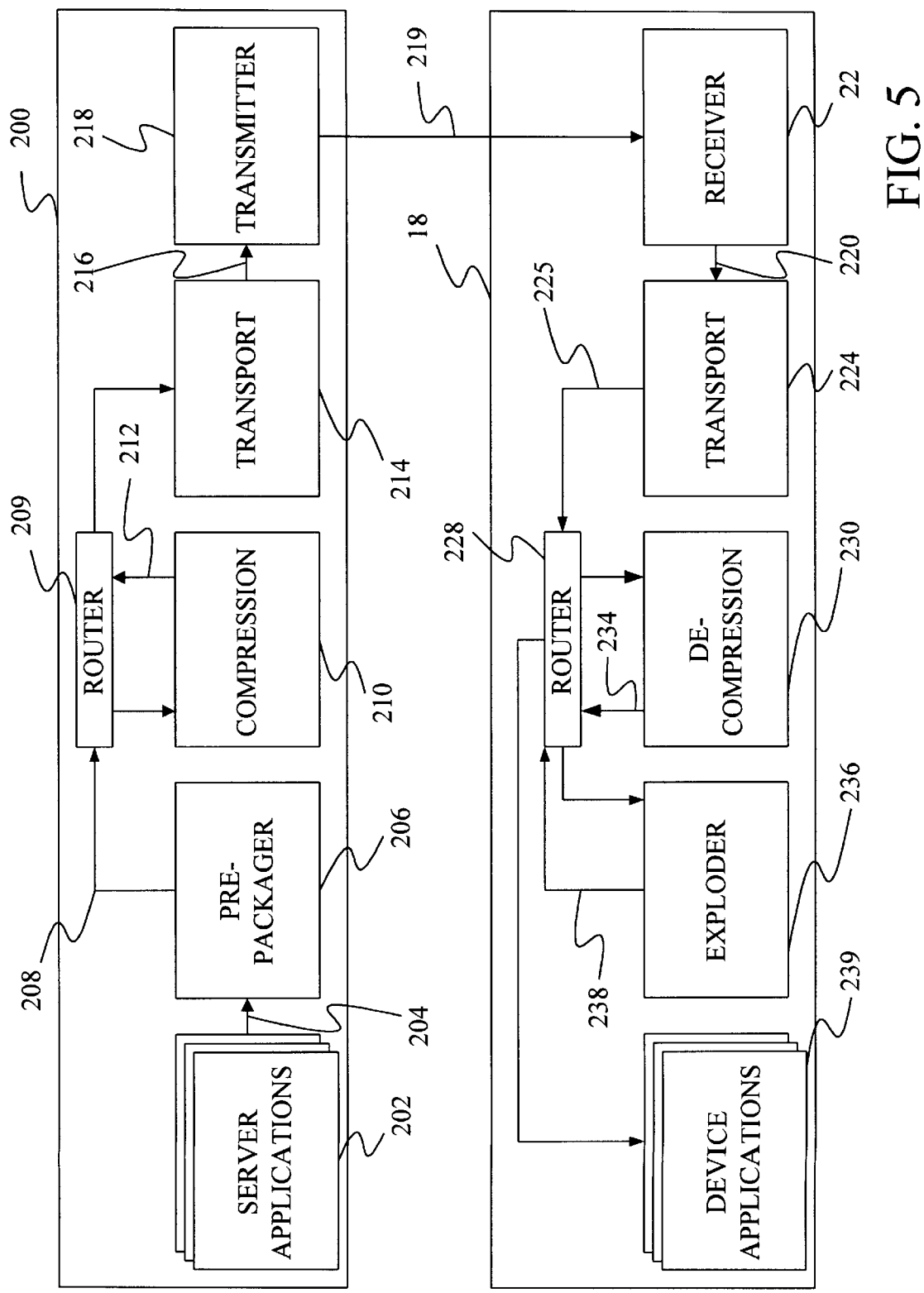
FIG. 5 is a block diagram showing the transformation of data under the present invention.

FIG. 5 is a more detailed block diagram of the modules in mobile device 18, content provider 12 and wireless push server 20 for transmitting and receiving data under the present invention. In FIG. 5, modules common to wireless push server 20 and content provider 12 for providing information over the air and across a line, respectively, to mobile device 18 are shown in a common block denoted as data server 200. Thus, the blocks described in data server 200 of FIG. 5 can be found in both wireless push server 20 and content provider 12 under the present invention.

In data server 200, data server applications 202 generate data packets 204 that are provided to a pre-packager 206. Such data packets can include, for example, news, sports, stock and weather updates. Preferably, each of the data packets includes a header that has an address describing the particular mobile device that the data packet is directed toward. In some embodiments of the invention, the header also includes a sub-address, referred to as a group by the present inventors, that provides a description of a particular channel in the mobile device to which the data is assigned.

Pre-packager 206 stores the data packets for a period of time discussed further below, and after that period of time merges together data packets that have the same address and in some embodiments the same sub-address to form merged data packets. Each of the merged data packets preferably includes a header that describes the contents and destination for the merged data packet. Under these embodiments, for each address and sub-address, pre-packager 206 provides a merged data packet 208 to a router 209 along with the address and sub-address associated with the merged data packet.

Based on the address and sub-address, router 209 routes the merged data packet to a number of different translators. Examples of such translators are encryption modules used to secure the data in the merged data packet or encoding modules used to transform the merged data packet into a form that can be sent across the communication system (for instance, UUencoding). Additionally, the translators include a compression module such as compression module 210 of FIG. 5. Compression module 210 compresses merged data packet 208 or a translated form of merged data packet 208 to produce compressed packet 212. In most compression algorithms, this is accomplished by removing redundancies in the data packet received by the compression algorithm. In FIG. 5. compression module 210 can be any of a large number of available compression algorithms including LZ and GZip.

Compressed data packets 212 are provided to router 209, which appends a routing tag list to each compressed data packet to indicate the types of translations that were performed on the data packet and to indicate that the data packet is a merged data packet that has a plurality of smaller data packets each destined for the same address and under one embodiment the same sub-address. Router 209 then provides this combined packet to transport module 214, which adds a master header to the combined packet. The master header preferably includes the address and sub-address for the combined packet to form transport data 216, which is provided to transmitter 218. Transport 214 can also reformat the combined data packet it receives so that transport data 216 meets certain restrictions of the communications channel over which transmitter 218 transmits transport data 216.

In preferred embodiments, transmitter 218 is an antenna that transmits data over the air to mobile device 18. However, transmitter 218 can include a modem that transmits data over a hardware connection to mobile device 18. In addition, infrared communications can be used between server 200 and mobile device 18.

Mobile device 18 includes receiver 22, which receives the transmitted data 219 from transmitter 218. Receiver 22 provides low level filtering of transmitted information 219 by determining if transmitted data 219 is addressed to mobile device 18. In most embodiments, this filtering is implemented directly in the hardware of receiver 22 to limit power consumption. In addition, receiver 22 is capable of filtering out some information addressed to wireless device 18 based on preferences set by the user. Receiver 22 makes this determination by examining the sub-address found in the master header and comparing it against a table entry for that sub-address that indicates whether the user wishes to receive this information. If the user does not wish to receive this information, the entire packet is discarded by receiver 22. Preferably, receiver 22 performs all of its filtering functions while operating in a partial wake-up mode. In other words, only a small portion of wireless device 18 is powered during these filtering operations.

Note that the filtering operations performed by receiver 22 are more efficient under the present invention. Instead of partially waking receiver 22 for each message created by applications 202 of server 200, one embodiment of the present invention only wakes receiver 22 once for each merged packet destined for the same address and sub-address. This significantly reduces the power consumed by receiver 22.

Receiver 22 pro-.ides received data 220 to transport 224, which performs the inverse functions of transport 214 of server 200 to provide combined data 225 to router 228. Router 228 examines the routing list in the combined data and sends the data to the appropriate translators, in the appropriate order, to recover the merged data packet. Preferably, this includes sending the data to a decompression module that performs the inverse of the compression function performed by compression module 210 to produce decompressed data 234 that is returned to router 228

Once all of the necessary translations have been performed on the data to produce a recovered merged data packet, router 228 routes the recovered merged packets to an exploder 236 based on a tag in the routing list. In one embodiment, exploder 236 examines each of the title IDs in the header of the merged data packet to determine if mobile device 18 has been configured to filter any of the title IDs. For each title ID that is filtered, exploder 236 ignores the associated individual packets in the merged data packet. For the title IDs that are not filtered, exploder 236 divides the associated data packets apart and returns individual packets 238 to router 228 after attaching a header to each of the individual packets 238 that includes a sub- address and title ID. Router 228 then routes each of the individual packets 238 to a device application 239 based on the sub address and title ID.

Figure 6:
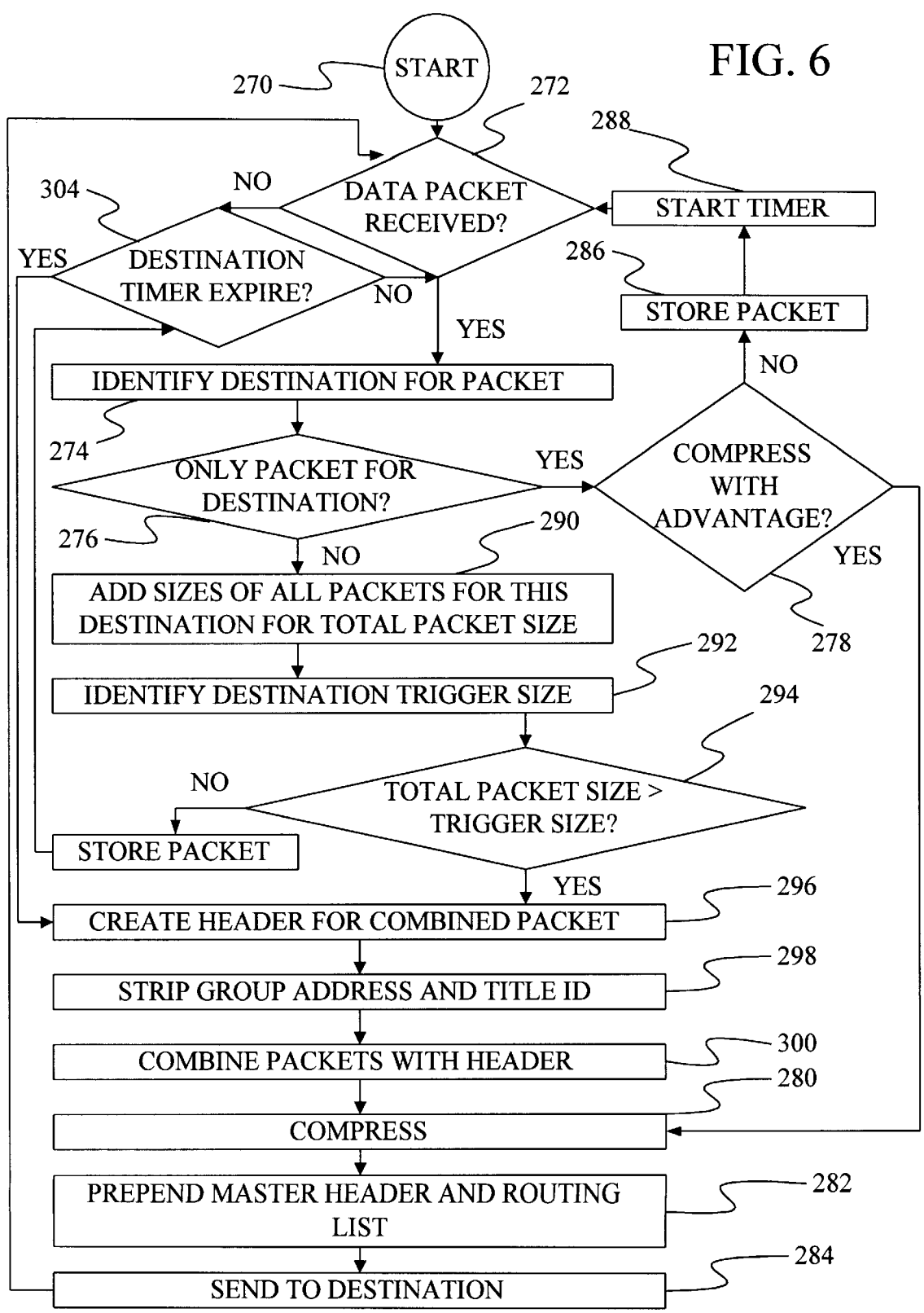
FIG. 6 is a flow diagram illustrating the operation of a mobile device in accordance with one aspect of the present invention.

FIG. 6 is a flow diagram of a method of the present invention performed by pre-packager 206, compression module 210, router 209 and transport module 214 to combine multiple messages before compressing them. The method of FIG. 6 starts at start block 270 and proceeds to decision step 272 where pre-packager 206 determines if a data packet has been received from a data server application 202. If a data packet has been received, pre-packager 206 identifies the destination for the packet by examining the address and sub-address for the packet at a step 274. At step 276, pre-packager 206 determines if this packet is the only packet for the destination. If it is the only packet for that destination, pre-packager 206 examines the size of the packet to determine if it is long enough to be compressed directly by compression module 210 and achieve a reduction in length through such compression. This determination is made in step 278 and can also be thought of as determining if there would be an advantage in compressing this data packet by itself. If there would be an advantage in compressing the data packet by itself, the data packet is compressed at a step 280. Router 209 then adds a routing list to the compressed data and transfer module 214 adds a master header at a step 282. The complete packet is sent by transmitter 218 at step 284, and control returns to step 272 where the system waits for another data packet.

If a packet by itself is not large enough to compress with advantage in step 278, the packet is stored at a step 286 and a destination timer is started at step 288. The destination timer provides a period of time by which the first packet will be sent to the destination. Thus, although the present invention attempts to wait until it has enough messages to compress with advantage, if it does not receive enough messages by the time the destination timer runs out, it sends all of the packets that are currently stored for that address and sub-address. The length of time provided by the destination timer is chosen as a balance between optimizing the bandwidth of the communication channel and providing the user with sufficiently current information.

Once the destination timer has been set in state 288, the method continues at state 272 where pre-packager 206 determines if another data packet has been received. If another data packet is found, the process proceeds through steps 274 and 276 as described above. If at step 276, the present packet is not the only packet for the destination, the method continues at step 290 where the lengths of all of the packets are added together to determinate the total packet size. The method then identifies a destination trigger size at a step 292. The destination trigger size is the size of the total packet that is determined to be large enough to provide a sufficient compression advantage so that it is no longer desirable to wait for additional packets before compressing.

The determination of whether the total packet size is larger than the trigger size is made in step 294. If the total packet size is larger than the trigger size, pre-packager 206 generates a single header that describes all of the packets destined for this particular address and sub-address. This occurs at step 296. In step 298, pre-packager 206 strips the group address and article I.D. from the individual packets and in a step 300, combines all of the stripped packets with a single header. The combined packets and header are then compressed by compression module 210 in step 280 and a master header and routing list is pre-pended to the compressed data at step 282. Transmitter 218 then sends the data to mobile device 18 at step 284.

If in step 294, the total packet size is not greater than the trigger size, the current packet is stored along with the previously received packets at a step 302. The process then proceeds to a step 304, where it determines if any destination timers have expired. If none of the destination timers have expired, the method continues at step 272 where pre-packager 206 determines if a data packet has been received. If a data packet has not been received, the system returns to step 304 where it once again determines if any destination timers have expired. Thus, the system loops between states 304 and 372 until another data packet is received or a destination timer expires.

When a destination timer expires in step 304, control returns to step 296 where pre-packager 206 creates a single header for all of the data packets associated with the destination timer. Pre-packager 206 then performs steps 298 and 300 as discussed above. The combined data packet is then compressed at step 280 and a master header and routing list is added to the compressed data at step 282. The output package is then sent to the destination at step 284. Once a packet for a particular destination has been sent, control returns to step 272.

Figure 7:
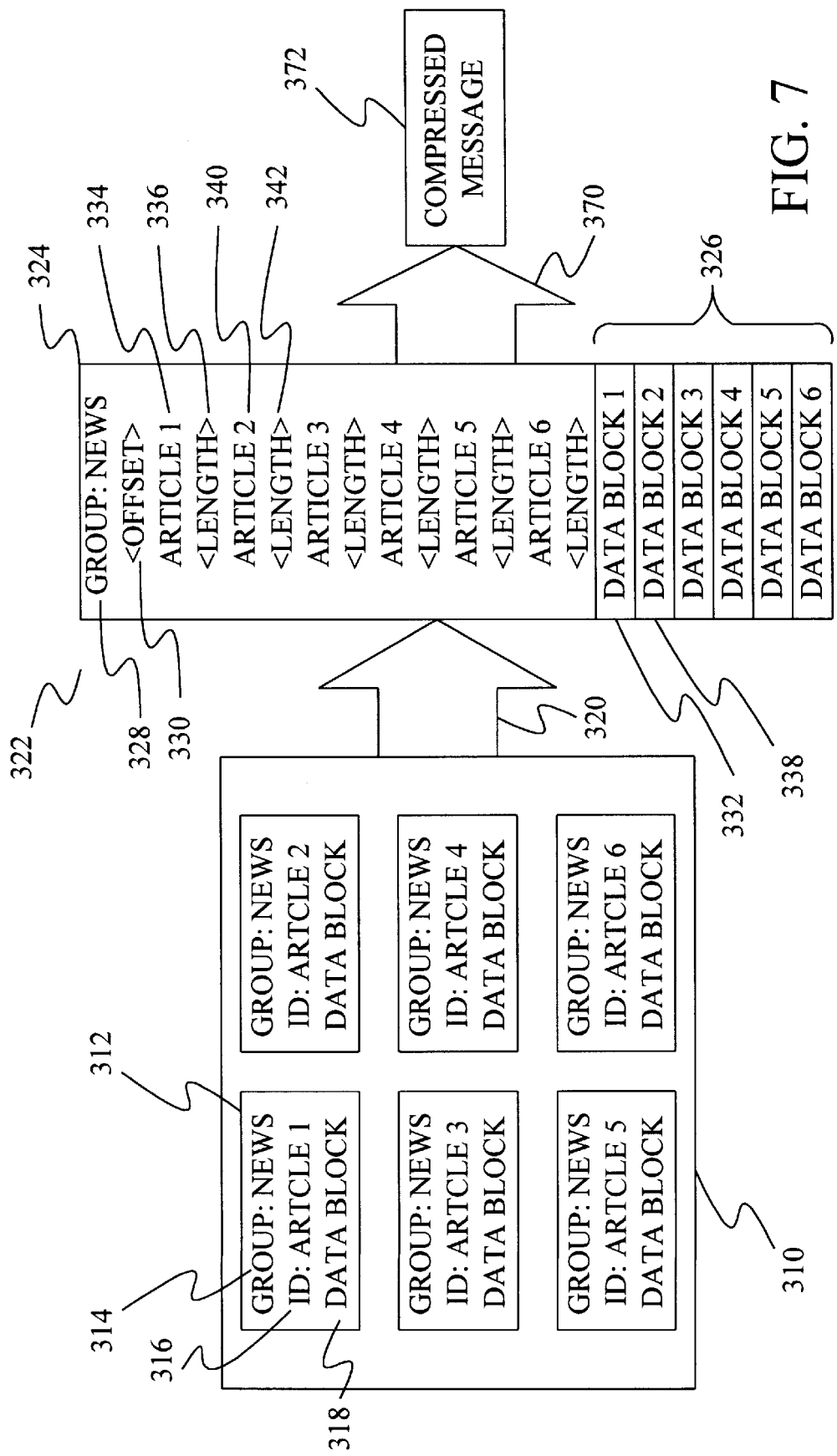
FIG. 7 illustrates a general data structure of a packet transmitted to a mobile device in accordance with one aspect of the present invention.

FIG. 7 shows a block diagram depicting the transformation of data that occurs through the method described in FIG. 6. In FIG. 7, data packets stored in steps 286 and 302 of FIG. 6 are grouped together in memory as message block 310. Each message includes a group identifier, an article identifier, and a data block. The group identifier identifies the address and sub address of the message and the article identifier provides a title for the message. Message 312 is an example of the messages in message block 310. It includes a group identifier 314 denoted as "News", a title identifier 316 denoted as "Article 1" and a data block 318. Note that each of the messages in message block 310 have the same group identifier denoted as "News" in FIG. 7. Message block 310 is passed through the pre-packaging steps of FIG. 6, denoted as pre-packaging 320 in FIG. 7, to produce a merged packet 322.

Merged packet 322 includes a header 324 and a data segment 326. Header 324 includes a group identifier 328 that identifies the sub-address for each of the data blocks in data segment 326. In the example of FIG. 7, group identifier 328 is "News". Although, group identifier 328 is shown as "News" in FIG. 7, those skilled in the art will recognize that in an actual implementation, group identifier 328 will be a hexadecimal value representing the sub-address.

After group identifier 328, header 324 includes an offset 330 that indicates the location of the first data block 332 in data segment 326. Offset 330 is calculated relative to the last bit of group ID 328. After offset 330, header 324 includes a title identifier and a length for each data block in data segment 326. Thus, first data block 332 has a title identifier 334 and a length 336 that follow offset 330. Second data block 338 has title identifier 340 and length 342 that follow length 336. Similar title identifiers and lengths are provided for each data block in data segment 326. After the last length in header 324, data segment 326 begins and provides data blocks in the same order as their title identifiers and lengths appear in header 324. The data blocks in data segment 326 do not include group identifiers or title identifiers.

Header 324 and data segment 326, are compressed by compression module 210 as noted by arrow 370 of FIG. 7. This results in a compressed message 372.

Although the present invention has been described in a system that uses address, sub-address and title ID filtering, the invention can also be practiced with systems that only provide address and sub-address filtering or that only provide address filtering. For systems that only provide address filtering, different packets destined for multiple sub-addresses can be included in the same merged data packet.

By combining small messages that by themselves do not achieve an advantage when compressed, the present invention is able to achieve better bandwidth. In addition, by combining messages that are destined for a common address, the present invention is able to awake the mobile device less often and thus is able to conserve power on the mobile device. Thus, under the present invention, the mobile device can reject a large number of messages during a single wake-up event by simply examining the common group address for all of the messages in the merged packet.

Although the present invention has been described with reference to preferred embodiments, workers skilled in the art will recognize that changes may be made in form and detail without departing from the spirit and scope of the invention.

What is claimed is:

1. In a computer system, a computer readable medium having computer executable instructions for performing steps comprising:

storing a first data packet destined for a first destination;

storing a second data packet destined for the first destination;

appending the second data packet to the first data packet to produce a merged data packet only if the first data packet is of a length that does not provide a reduction in size if the first data packet is compressed by itself;

compressing the merged data packet to produce a compressed packet; and sending the compressed packet to the first destination.

2. The computer systems of claim 1 having further computer executable instructions for performing a further step of pre-pending a header to the merged data packet before compressing the header and merged data packet to form the compressed packet.

3. The computer system of claim 2 wherein the header comprises a destination identifier that identifies at least part of the first destination's address.

4. The computer system of claim 3 wherein each individual data packet has a length and the header comprises the length of each individual data packet in the merged data packet.

5. The computer system of claim 4 wherein the header further comprises a title for each data packet in the merged data packet.

6. The computer system of claim 5 wherein the titles and lengths of the data packets are arranged in the same order as the data packets are arranged in the merged data packet.

7. The computer system of claim 6 wherein the header further comprises an offset value located between the destination identifier and a length of a data packet in the header, the offset describing the location of the first data packet in the merged data packet relative to the destination identifier.

8. The computer system of claim 2 wherein the computer readable medium has further computer executable instructions for performing a further step of pre-pending a routing tag to the compressed packet before sending the compressed packet to the first destination, the routing tag being capable of indicating that the compressed packet comprises a merged data packet.

9. The computer system of claim 8 wherein the computer readable medium has further computer readable instructions for performing steps of:

receiving the compressed packet at a receiver associated with the first destination;

based on a routing tag, routing the compressed packet to a decompression module to produce a decompressed packet; and based on a routing tag, routing the decompressed packet to an exploder to produce individual data packets.

10. The computer system of claim 1 wherein the computer readable medium comprises further computer executable instructions for performing a further step of storing a plurality of additional data packets before appending the second data packet to the first data packet.

11. The computer system of claim 10 wherein the computer readable medium comprises further computer executable instructions for appending the plurality of data packets to the merged data packet before compressing the merged data packet.

12. A method of transmitting data packets to a wireless device, the method comprising:

generating a first data packet so that it has an address header that indicates that the first data packet is destined for the wireless device;

storing the first data packet for a period of time;

generating a second data packet so that it has an address header that indicates that the second data packet is destined for the wireless device;

determining if the first data packet should be compressed by itself;

appending at least a portion of the first data packet to at least a portion of the second data packet to form a merged packet only if the first data packet should not be compressed by itself;

compressing the merged data packet to produce a compressed packet; and sending the compressed packet to the wireless device.

13. The method of claim 12 further comprising before compressing the merged data packet, pre-pending a header to the merged data packet.

14. The method of claim 13 wherein pre-pending a header comprises pre-pending a header that identifies the address of the wireless device.

15. The method of claim 13 wherein pre-pending a header comprises pre-pending a header that identifies the lengths of the first data packet and the second data packet.

16. The method of claim 13 wherein pre-pending a header comprises pre-pending a header that identifies titles for the first and second data packets.

17. The method of claim 13 wherein pre-pending a header comprises pre-pending a header that provides an offset describing the location of the start of the first data packet in the merged data packet.

18. The method of claim 12 further comprising pre-pending a routing tag to the compressed packet to indicate that the compressed packet comprises a merged data packet.

* * * * *

UNITED STATES PATENT AND TRADEMARK OFFICE
CERTIFICATE OF CORRECTION

PATENT NO.   : 6,304,914 B1
DATED        : October 16, 2001
INVENTOR(S)  : Deo et al.

It is certified that error appears in the above-identified patent and that said Letters Patent is hereby corrected as shown below:

<u>Title page,</u>
Under Item [56], References Cited: delete "9,107,899   6/1998   Tuniman et al."

<u>Column 7,</u>
Line 36, replace "pro-.ides" with -- provides --.

Signed and Sealed this

Twentieth Day of August, 2002

*Attest:*

JAMES E. ROGAN
*Attesting Officer*     *Director of the United States Patent and Trademark Office*